July 12, 1932. J. N. WHITE 1,866,782
METHOD AND IMPLEMENT FOR EXPANDING SPRINGS
Filed Nov 1, 1927
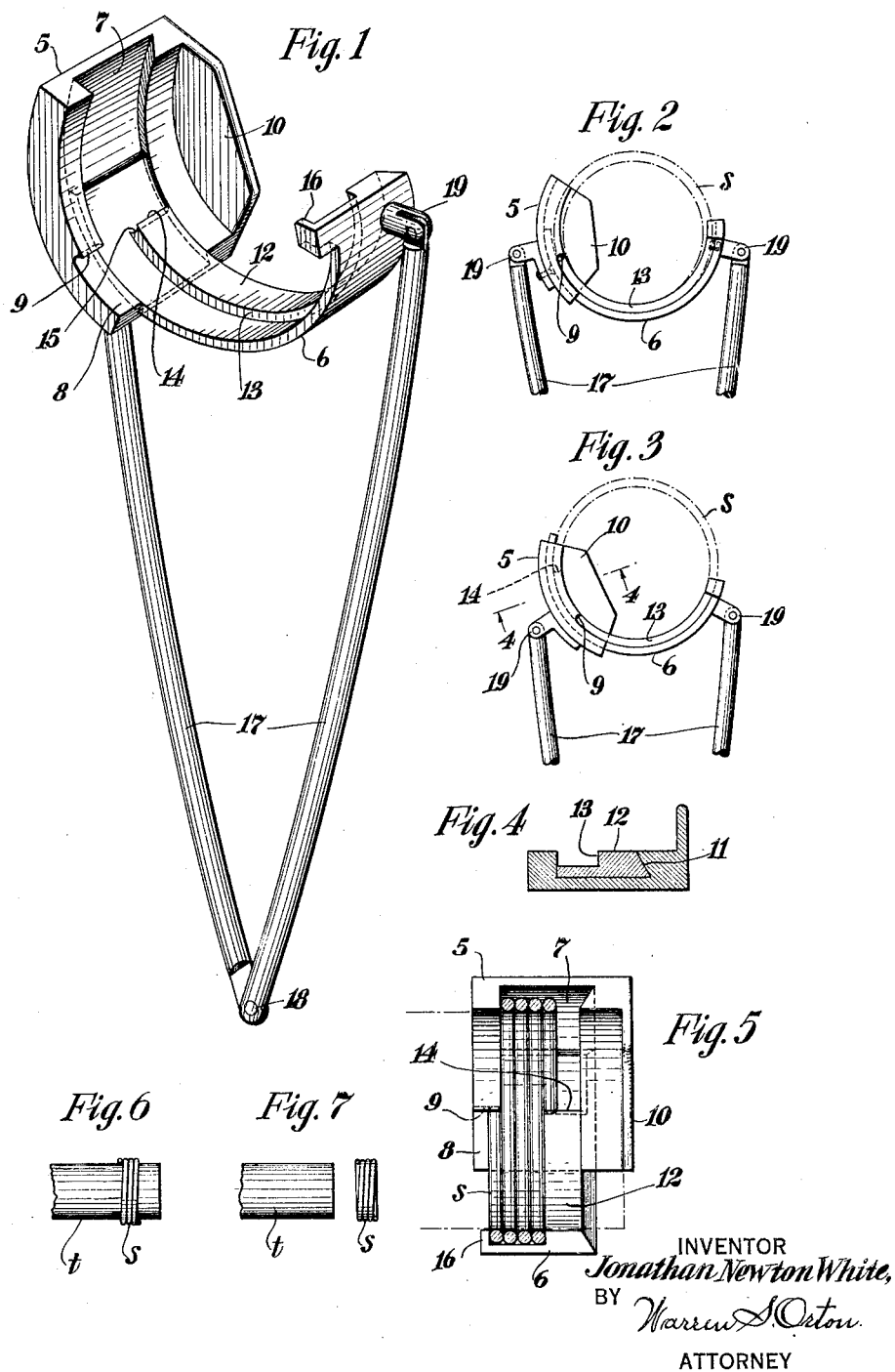
INVENTOR
Jonathan Newton White,
BY
Warren S. Orton
ATTORNEY Patented July 12, 1932

1,866,782

UNITED STATES PATENT OFFICE

JONATHAN NEWTON WHITE, OF NEW YORK, N. Y., ASSIGNOR TO UNITED METAL HOSE CO. INC., OF NEW YORK, N. Y., A CORPORATION OF NEW YORK

METHOD AND IMPLEMENT FOR EXPANDING SPRINGS

Application filed November 1, 1927. Serial No. 230,376.

My invention relates to an implement for facilitating the application or removal of helically wound springs to and from flexible tubes such as a hose or the like.

With certain types of two part hose couplings now in use one of the coupling members is held against longitudinal movement on the hose by a helically wound spring usually of less internal diameter than the external diameter of the hose and bindingly engaging the latter. It is a difficult and laborious operation as practiced at present to correctly place these springs on the hose.

The principal object of the invention is to provide a simple form of hand implement by means of which the spring may be circumferentially distorted to increase the normal diameter of its convolutions and to retain the latter in this distended condition until the spring is slipped on the tube which it is intended to engage.

Another object of the invention is to provide a hand implement of this character which is operable to distort the spring radially by a slight hand pressure and which when released allows the spring to assume its normal contracted diameter to effect a gripping action on the hose or other flexible tube.

The invention further contemplates the providing of a holder for retaining the spring having a pair of pressure extorting abutments which engage the extremities of the spring to radially expand its convolutions while the spring is held in a position where it may be conveniently slipped on the hose.

It is also an object of the invention to provide an implement for expanding helical springs radially which may be operable by one hand thus leaving the operator's other hand free to hold the hose in position to receive the expanded spring.

Various other objects and advantages of the invention will be in part obvious from an inspection of the accompanying drawing and in part will be more fully set forth in the following particular description of one form of mechanism embodying my invention, and the invention also consists in certain new and novel features of construction and combination of parts hereinafter set forth and claimed.

On the drawing;

Fig. 1 is a perspective of the implement in position to receive the spring to be distended, and Fig. 2 is a fragmentary view in end elevation of the same and showing in dot and dash lines a spring held therein prior to the expanding operation, Fig. 3 is a similar view illustrating the device in operated position and the spring expanded;

Fig. 4 is an enlarged transverse sectional view taken on line 4—4 of Fig. 3 and looking in the direction indicated by the arrows, Fig. 5 is a top plan view of the device having a spring accommodated therein, the spring being shown in longitudinal cross section;

Fig. 6 is a detail view of the hose and spring associated therewith; and

Fig. 7 is a similar view of the hose and spring separated.

Referring to the disclosure in the drawing, a spring holder is provided embodying a pair of coacting oppositely curved spring embracing members 5 and 6 which are slidably associated for relative circumferential movement and normally disposed in opposed relation. The member 5 is of a relatively great width and thickness as compared to the member 6 and is formed with a longitudinal groove 7 upon its inner face, and extending the entire length of the member 5. This groove slidably receives the member 6. The flange 8 outlining one side of the groove is cut away at the end adjacent the member 6 to form a hook-like abutment 9 for engaging one end of the springs.

In order to position the spring at a predetermined position on the hose a stop plate is provided on the member 5. This plate is in the form of a web 10 formed integral with and extending the length of the outer edge of this member 5 and projecting at right angles to its axis towards the member 6. In use this stop plate will be in the path of the hose and engage the latter to limit the end-wise movement of the device on the hose and thereby act as a gauge to cause the spring to be located at the proper joint on the latter.

To cause the two members 5 and 6 to move into parallelism and to prevent lateral separation of the same in a direction at right angles to the path of movement of these members, one of the side walls of the groove 7 and the adjacent longitudinal edge of the member 6 are beveled in the same plane as indicated at 11 to cause these parts to interlock.

The inner face of the member 6 is formed with a raised longitudinally extending portion 12 which extends from one end of this member 6 to a point adjacent the opposite end of the latter. This raised portion defines a longitudinal shoulder 13 extending along the inner face of the member 6 intermediate its longitudinal edges against which the helical spring being operated upon engages and a transverse shoulder or abutment 14 adapted to engage one of the spring terminals, the latter having a concavity 15 to accommodate the spring terminal.

In practice the spring is inserted in the implement with its convolutions confined between the longitudinal shoulder 13 and the opposite wall of the groove 7 in the member 5. In order to assist these parts in the retention of the spring a laterally extending L shaped spring engaging element 16 projects from the inner edge of the member 6 at its outer edge, the element 16 being disposed in opposed relation to the abutment 9 and movable in a plane substantially in horizontal alignment therewith.

The members 5 and 6 are provided with a pair of divergent levers 17 pivotally connected at their outer ends 18. The opposite ends of these levers are pivoted to laterally extending bifurcated ears 19 carried by the outer faces of the members 5 and 6 adjacent their outer ends. As illustrated in Fig. 2 the ears 19 are offset from each other whereby the force applied to the members 5 and 6 upon operation of the levers towards each other will not be directly opposed and thus interfere with the movement of these members.

In the operation of the implement the spring is placed in the holder with its convolutions resting upon the member 6 and extending parallel to the longitudinal axis of this member. With the spring thus placed the end convolutions are engaged by the longitudinal shoulder 13, the rear side wall of the groove 7 and the L shaped element 16 and the extremities of the spring engaged with the abutments 9 and 14 respectively. The operator now grips the levers in one hand squeezing the latter together moving the members 5 and 6 in an arc of a circle towards each other and exerting strain upon the spring extremities in reverse directions to distort or expand its convolutions circumferentially to temporarily increase the diameter of the spring. The spring being thus expanded the holder and spring are slipped endwise on the hose as suggested in Figs. 6 and 7 until the gauge element abuts the hose extremity. The levers are now manipulated to move the members 5 and 6 away from each other relieving the spring from strain and allowing it to recoil or contract to its normal size about the tube $t$.

Having thus described my invention, I claim:—

1. In combination, a pair of oppositely curved slidably associated members, a raised longitudinal portion formed on the inner face of one of the members to hold a coil spring against movement in one lateral direction and a transverse abutment to engage one of the spring terminals, means for retaining the spring against movement in the opposite lateral direction, a second abutment on the other member to engage the opposite spring terminal, and manually operable means for moving the members in a direction to apply pressure to the spring to expand its convolutions circumferentially or in a direction to release the pressure from the spring.

2. In the art of expanding helically wound springs having a plurality of convolutions to permit their insertion while so expanded over a cylindrical member, the method which consists in applying pressure in reverse circumferential directions to the spring terminals while limiting the freedom of radial distention of the convolutions of the spring, whereby to place the entire spring under compression and move the convolutions uniformly relative to each other to expand the diameter of the convolutions of the entire spring and thus retain the cylindrical shape of the spring while temporarily increasing their diameters.

3. An implement for circumferentially expanding helically wound springs including a pair of oppositely movable spring holding members provided with abutments equally spaced from a common axis of rotary movement, designed to engage the spring terminals and disposed to apply torque to all of its convolutions and means engaging opposite ends of the spring to prevent relative axial movement of the convolutions of the spring.

4. A device of the character described including a pair of oppositely disposed slidably connected spring holders provided with abutments arranged to engage the terminals of a helically wound spring and exert strain upon the latter to circumferentially expand its convolutions, and levers operatively connected with the holders to impart sliding movement to the latter.

5. A device of the character described including a coil spring holder having a pair of oppositely curved slidably connected members to retain the spring and engage the terminals of the latter, and means for moving the abutments to pressure exerting and inoperative positions.

6. A device of the character described including a coil spring holder having a pair of oppositely curved slidably connected members to retain the spring and engage the terminals of the latter, and means for moving the abutments to pressure exerting and inoperative positions and a pair of pivotally connected levers each having one end pivotally connected with one of the members.

7. A device of the character described including a coil spring holder comprising a pair of oppositely curved slidably connected members provided with abutments to retain the spring and engage the terminals of the latter, said abutments being spaced apart longitudinally of the axis of the spring holder and means for moving the abutments to pressure exerting and inoperative positions and a pair of pivotally connected levers each having one end pivotally connected with one of the members, the points of pivotal connection of the levers with the members being offset from each other whereby to dispose the lines of pressure in different parallel planes.

8. A device of the character described including a coil spring holder embodying a pair of slidable oppositely curved members, one of which has a groove securing the other, a spring terminal engaging abutment carried by each member, and means for sliding the members relative to each other.

9. A device for circumferentially expanding and applying helically wound springs to flexible tubes including a spring holder arranged to be slipped onto the tube and means on the spring holder for circumferentially expanding the spring and operable to permit the spring to assume its normal diameter after the spring has been expanded and the spring holder slipped onto the tube, and a stop plate carried by the holder to engage the tube end whereby the movement of the holder is limited on the tube and the spring disposed at a predetermined position thereon.

10. An implement for circumferentially expanding helically wound springs including a pair of oppositely movable spring holding members for engaging the outer peripheral surface of the spring in spaced relation to the opposite ends of the spring and said holding members provided with abutments movable in a common cylindrical surface and axially offset from each other to engage the spring terminals and disposed to apply torque to its convolutions and means for applying manual pressure to the abutments.

11. The method of expanding helically wound springs having a plurality of convolutions arranged in a cylindrical form which consists in applying torque to its convolutions to expand all of the convolutions circumferentially, while holding the end convolutions of the spring to restrain any tendency to move axially and while limiting the extent of radial distention of the end convolutions.

12. A device of the character described including a pair of oppositely disposed spring holders one slidably mounted in the other and provided with abutments arranged to engage the terminals of a helically wound spring and exert strain upon the latter to circumferentially expand its convolutions towards said holders and means for causing the holders to move relative to each other.

13. An implement for circumferentially expanding helically wound springs including a spring holder for partially encircling the springs and provided with relatively movable members movable in parallel spaced apart planes extending perpendicular to their axis of rotation and movable circumferentially of the spring to exert torque on its convolutions.

14. An implement for circumferentially expanding helically wound springs including a spring holder embodying relatively movable members one slidably guided on the other for movement about the spring and provided with stops movable in parallel spaced apart planes extending perpendicular to their axis of rotation to exert torque on its convolutions and manually operable means for moving the members relative to each other.

15. An implement for circumferentially expanding helically wound springs including a spring holder for encircling the springs for more than 180° of their perimeter, said holder provided with relatively movable members in spaced relation to a common axis of rotation to exert torque on the convolutions of the spring and thus expand the same towards the encircling holder.

Signed at New York in the county of New York and State of New York this 25th day of October A. D. 1927.

JONATHAN NEWTON WHITE.